United States Patent
Walker et al.

(10) Patent No.: US 6,616,458 B1
(45) Date of Patent: *Sep. 9, 2003

(54) METHOD AND APPARATUS FOR ADMINISTERING A SURVEY

(76) Inventors: Jay S. Walker, 124 Spectacle La., Ridgefield, CT (US) 06877; James A. Jorasch, 25 Forest St., Apt. 5G, Stamford, CT (US) 06901; Magdalena Mik, 10 S. New St., Greenwich, CT (US) 06830

( * ) Notice: Subject to any disclaimer, the term of this patent is extended or adjusted under 35 U.S.C. 154(b) by 0 days.

This patent is subject to a terminal disclaimer.

(21) Appl. No.: 09/396,155

(22) Filed: Sep. 14, 1999

Related U.S. Application Data

(63) Continuation of application No. 09/110,626, filed on Jul. 6, 1998, now Pat. No. 6,093,026, which is a continuation-in-part of application No. 08/685,706, filed on Jul. 24, 1996.

(51) Int. Cl.[7] .......................... G09B 7/00; G09B 19/00; G06F 17/60
(52) U.S. Cl. ...................... 434/322; 434/236; 434/353; 434/362; 705/10
(58) Field of Search .................. 434/236, 322, 434/323, 353, 354, 362; 455/2.01; 705/10

(56) References Cited

U.S. PATENT DOCUMENTS

| | | | |
|---|---|---|---|
| 4,816,904 A | | 3/1989 | McKenna et al. ............. 725/11 |
| 5,553,145 A | | 9/1996 | Micali .......................... 380/30 |
| 5,557,773 A | | 9/1996 | Wang et al. .................... 707/3 |
| 5,725,384 A | | 3/1998 | Ito et al. ...................... 434/350 |
| 5,740,035 A | | 4/1998 | Cohen et al. ................. 705/10 |
| 5,961,332 A | * | 10/1999 | Joao ............................. 434/236 |
| 6,139,430 A | * | 10/2000 | Huard et al. .................. 463/16 |

(List continued on next page.)

FOREIGN PATENT DOCUMENTS

| | | |
|---|---|---|
| EP | 128481 A2 | 12/1984 |
| JP | 09097250 | 4/1997 |

OTHER PUBLICATIONS

"Overset: Interactive—So you Think You Should Know a Thing or Two About Web Development", Media Daily, Feb. 20, 1997.

"Customer Service Group", Customer Satisfaction Technology, Oct. 1997 (http://www.alexcommgrp.com/csg/html/cstarticle.htm.).

"New Software Brings Power and Capability to Web Research—Quantime Corp. Introduces Quancept Web", Quantime Corp. (http://wwwquantime.co.uk/corporate/press/QCweb.html), Nov. 1997.

(List continued on next page.)

Primary Examiner—John Edmund Rovnak

(57) ABSTRACT

In accordance with the present invention, a controller such as an online service provider computer or an ISP computer receives a survey including survey questions from a client desiring to have a survey conducted. The controller creates respondent questions based on the survey questions. The controller also selects one or more respondents from a list of possible respondents, such as a list of customer accounts. The respondent questions are transmitted to the selected respondents. Responses corresponding to the respondent questions are received. The controller applies an inconsistency test to the responses to generate an inconsistency test result. The inconsistency test determines if the responses originate from computers or humans not paying attention to the questions. Based on the inconsistency test result, a fraud signal may be generated. The fraud signal may result in several actions, such as the controller ignoring the responses received from the corresponding respondent, reducing or eliminating payment to the respondent, transmitting a message of reprimand to the respondent, and/or barring the respondent from future participation in surveys.

22 Claims, 21 Drawing Sheets

U.S. PATENT DOCUMENTS

| | | | | |
|---|---|---|---|---|
| 6,256,614 | B1 | * | 7/2001 | Wecker et al. ................ 705/14 |
| 2001/0003099 | A1 | * | 6/2001 | Von Kohorn ................ 463/40 |
| 2001/0052009 | A1 | * | 12/2001 | Desai et al. ................ 709/224 |
| 2001/0052122 | A1 | * | 12/2001 | Nanos et al. ................ 725/9 |
| 2002/0002482 | A1 | * | 1/2002 | Thomas ................ 705/10 |

OTHER PUBLICATIONS

Arnold B. Urken, Polls Surveys, and Choice Processor Technology on the World Wide Web, www Journal, Issue 3.

"New Website Pays Cash to Surf", PR Newswire, Feb. 3, 1998.

"Feedback Express—How It Works", (http://www.feedbackexpress.com/how.htm), download date Apr. 30, 1998.

"Survey.Net" (http://www.survey.net/index.htm), download date May 26, 1998.

"Juno News" (http://www.juno.com/pr/marketfacts.htm), download date, May 27,1 998.

"Phase 5 Techniques and Resources" (http://www.phase–5.com/techniques.htm), download date, May 27, 1998.

"Online Research Methodologies", Opinionator (http://www.cltresearch.com/OP8R.htm), download date, May 27, 1998.

"Bussoft Online Market Research" (http://www.bus.net/survey.html), download date, May 27, 1998.

"TestNow– Learn More" (http://www.testnow.com/info/learn.htm), download date, Jun. 12, 1998.

"Payment Information" (http://www.htmail.com/payment.html), download date, Jun. 19, 1998.

"Greenfield Online" http: (http://greenfieldonline.com), download date, Jun. 19, 1998.

"IBM: An Introduction to Interactive Television", International Business Machines, (www.hursley.ibm.com/misc/xw–itvintro.html), Copyright Date: 1995,; download date; Jan. 29, 1999.

"@PCData Home Page" (http://www.okpayme.com/payyou.asp) download date Mar. 31, 1999.

"How Does The Visionary Shopper Work?", Simulation Research, (http://www.simulationresearch.com/vs.htm), download date: Sep. 8, 1998.

* cited by examiner

| CLIENT IDENTIFIER 308 | CLIENT NAME 310 | CLIENT ADDRESS 312 | BILLING INFORMATION 314 | PREFFERED RESULTS DELIVERY METHOD 316 |
|---|---|---|---|---|
| C 100 | CORPORATION X | 1 MAIN ST. CITY, STATE | SEND TO POSTAL ADDRESS | TO POSTAL ADDRESS |
| C 101 | POLITICAL PARTY A | 10 ELM DR. ANYWHERE, NY | CHAGE CREDIT CARD ACCOUNT 1111-1111-1111-1111 | FAX TO (111) 555-5553 |
| C 102 | MUNICIPALITY Q | 1 PROSPECT ST. SMALLVILLE, USA | E-CASH DELIVERED WITH SURVEY | ABC@ MUNICIPALITY.COM |

| ACCOUNT IDENTIFIER 608 | NAME 610 | ADDRESS 612 | GENDER 614 | BIRTHDATE 616 | E-MAIL ADDRESS 618 |
|---|---|---|---|---|---|
| R 1000 | JOHN SMITH | 1 MAIN ST. NOWHERE, USA | M | 8/1/60 | — |
| R 1001 | JANE DOE | 1 PARK ST. NY, NY | F | 9/2/70 | DOE@X.COM |
| R 1002 | STEVE DRAW | 1 LONG ST. LOS ANGELES, CA | M | 3/4/75 | — |

| PUBLIC KEY 620 | PARTICIPANTS IN SURVEYS? 622 | RATING 624 | NUMBER OF SUCCESSFULLY COMPLETED SURVEYS 626 | ADDITIONAL FEATURES 628 |
|---|---|---|---|---|
| — | NEVER | 0 | 0 | FERRARI MECHANIC, SKIER |
| — | YES | 1 | 10 | PATENT ATTORNEY, JOGGER |
| — | ONLY WHEN ON-LINE | 4.3 | 84 | VISIOLOGIST, VIOLIN PLAYER |

FIG. 6

| CERTIFICATION QUESTION IDENTIFIER 806 | CERTIFICATION QUESTION DESCRIPTION 808 | ANSWER SEQUENCE 810 | PROPER ANSWER 812 |
|---|---|---|---|
| 1 | "WHICH WAY DO THINGS FALL?" | 1 = UP, 2 = DOWN | DOWN |
| 2 | "WHAT COLOR IS THE SKY?" | 1 = BLUE, 2 = RED, 3 = ORANGE | BLUE |

| RESPONDENT IDENTIFIER 1606 | SURVEY IDENTIFIER 1608 | QUESTION IDENTIFIER 1610 | RESPONSE 1612 | DATE / TIME 1614 |
|---|---|---|---|---|
| R 1000 | 1111 | 1 | 2 | 8:15 AM 7/3/98 |
| R 1000 | 1111 | 2 | 1 | 8:15 AM 7/3/98 |

1600 ← (table)

1602 → (row 1)
1604 → (row 2)

FIG. 16

| SURVEY IDENTIFIER 1111 | |
|---|---|
| 1702 | |
| NUMBER OF RESPONSES = 10,101  1704 | CONFIDENCE LEVEL = 98%, 1  1706 |
| QUESTION IDENTIFIER  1712 | RESPONSES  1714 |
| 1 | 1 - 53%, 2 - 7%, 3 - 14%, 4 - 26% |
| 2 | 1 - 75%, 2 - 25% |

| QUESTION IDENTIFIER 1808 | QUESTION 1810 | ANSWER SEQUENCE 1812 | PRIORITY 1814 |
|---|---|---|---|
| 1 | "I BELIEVE THERE IS TOO MUCH VIOLENCE ON TELEVISION." | 1 = STRONGLY AGREE, 2 = AGREE SOMEWHAT, 3 = DISAGREE SOMEWHAT, 4 = STRONGLY DISAGREE | HIGH |
| 2 | "I PREFER FAMILY PROGRAMMING." | 1 = YES, 2 = NO | LOW |

1804 → row 1
1806 → row 2

METHOD AND APPARATUS FOR ADMINISTERING A SURVEY

The present application is a continuation application of patent application Ser. No. 09/110,626 entitled METHOD AND APPARATUS FOR ADMINISTERING A SURVEY filed Jul. 6, 1998, now issued as U.S. Pat. No. 6,093,026; which is a continuation-in-part application of co-pending patent application Ser. No. 08/685,706, entitled METHOD AND APPARATUS FOR A CRYPTOGRAPHICALLY-ASSISTED COMMERCIAL NETWORK SYSTEM DESIGNED TO FACILITATE AND SUPPORT EXPERT-BASED COMMERCE, filed on Jul. 24, 1996, the entirety of which is incorporated by reference herein as part of the present disclosure.

FIELD OF THE INVENTION

The present invention relates to methods and apparatus for administering surveys.

BACKGROUND OF THE INVENTION

Surveys are an effective tool for gathering data on a variety of facts and opinions. Surveys can aid many businesses and organizations in defining and/or achieving their goals and policies. A typical survey constitutes a set of questions which are distributed to a group of people having appropriate characteristics. The group returns responses to the questions, and the responses are assembled to determine, for example, average responses and majority responses.

Surveys may be efficiently conducted via computer networks, such as the Internet. For example, a joint project by Juno Online Services, L.P. and Market Facts, Inc. conducts surveys online. Similarly, SURVEY.NET conducts surveys and questionnaires and provides the results online.

In addition, respondents may be paid for taking a survey. For example, TESTNOW.COM, created by Concept test, Inc. asks its registrants to test various web site concepts and fill out an online questionnaire. Payments are provided for each completed questionnaire. Similarly, Feedback Express is a web site at www.feedbackexpress.com that pays Internet users for providing feedback about concepts they review online.

Surveys conducted via computer networks have not had wide success. Such surveys are particularly susceptible to a variety of attacks that compromise the integrity of collected data. Since surveys conducted via computer networks allow respondents to participate remotely, they are unsupervised and may submit random responses rather than meaningful responses. Even worse, an appropriately designed computer program can submit random or otherwise meaningless responses while appearing to be one or more respondents. Since such surveys are not widely accepted, few people participate in these surveys and those that do generally cannot be paid well. This results in a "chicken-and-egg" problem, where lack of respondents causes poor acceptance of the surveys, which in turn discourages respondents from participating.

Businesses could potentially benefit from surveys conducted via a computer network. However, there is always the possibility that a significant part of data collected from the survey will be inaccurate or otherwise untrustworthy.

Accordingly, it would be advantageous to provide a method and apparatus for conducting surveys that reduced or eliminated the above-described shortcomings.

SUMMARY OF THE INVENTION

It is an object of the present invention to provide a method and apparatus for conducting surveys that reduces or eliminates the shortcomings of known systems.

In accordance with the present invention, a controller such as an online service provider computer or an Internet Service Provider (ISP) computer receives a survey including survey questions from a client desiring to have a survey conducted. The controller creates respondent questions based on the survey questions. The controller also selects one or more respondents from a list of possible respondents, such as a list of customer accounts. The respondent questions are transmitted to the selected respondents. Responses corresponding to the respondent questions are received.

The controller applies an inconsistency test to the responses to generate an inconsistency test result. The inconsistency test determines if the responses originate from computers or humans not paying attention to the questions. Based on the inconsistency test result, a fraud signal may be generated. The fraud signal may result in several actions, such as the controller ignoring the responses received from the corresponding respondent, reducing or eliminating payment to the respondent, transmitting a message of reprimand to the respondent, and/or barring the respondent from future participation in surveys.

BRIEF DESCRIPTION OF THE DRAWINGS

FIG. 3 is a schematic illustration of a client database of the controller of FIG. 2.

FIG. 6 is a schematic illustration of a customer account database of the controller of FIG. 2.

FIG. 8 is a schematic illustration of a certification question database of the controller of FIG. 2.

FIG. 16 is a schematic illustration of a response database of the controller of FIG. 2.

FIG. 17 is a schematic illustration of a survey results database of the controller of FIG. 2.

FIG. 18 is a schematic illustration of another embodiment of the survey database of the controller of FIG. 2.

DETAILED DESCRIPTION OF THE PREFERRED EMBODIMENTS

Figure 1:
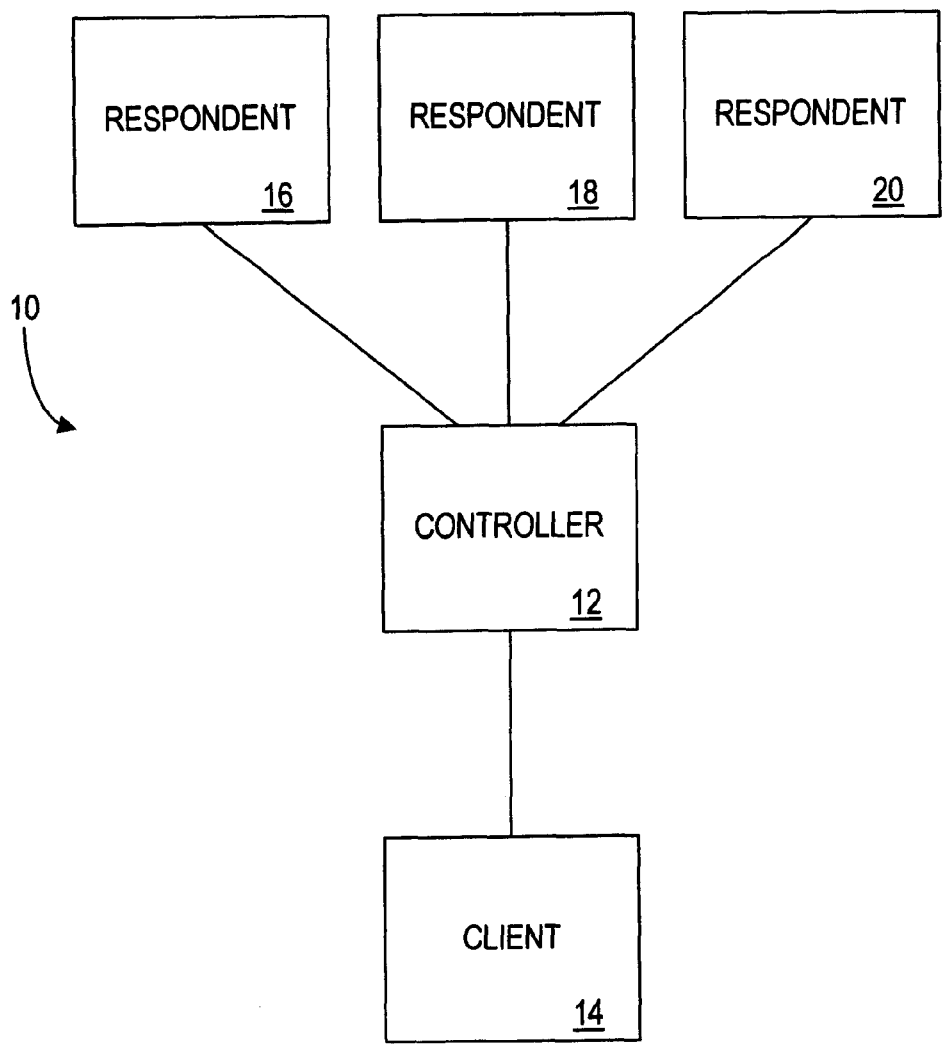
FIG. 1 is a schematic illustration of an apparatus for conducting a survey.

Referring to FIG. 1, an apparatus 10 for conducting a survey comprises a controller 12 that is in communication with a client device 14 and with respondent devices 16, 18 and 20. Each of the controller 12, the client device 14 and the respondent devices 16, 18 and 20 are typically computers or other devices for communicating over a computer network such as the Internet. Although three respondent devices are shown in FIG. 1, any number of respondent devices may be in communication with the controller 12.

The controller 12 receives desired survey questions and survey parameters from a client operating the client device 14. The controller 12 in turn conducts the specified survey by transmitting the survey questions to respondents via respondent devices 16, 18 and 20. In one embodiment, the controller 12 may be a computer operated by an online service provider or an Internet service provider (ISP). Such a computer typically facilitates the connection of many computers to the Internet.

The client device 14 and the respondent devices 16, 18 and 20 are typically conventional personal computers, such as those based on the Intel® Pentium® microprocessor. Those skilled in the art will understand that there are many appropriate apparatus for allowing the client device 14 and the respondent devices 16, 18 and 20 to communicate with the controller 12 over a network.

If desired, known cryptographic techniques may be used to authenticate the identity of parties transmitting messages in the apparatus 10 for conducting a survey. The use of cryptographic techniques can also serve to verify the integrity of the message, determining whether the message has been altered during transmission. Encryption can also prevent eavesdroppers from learning the contents of the message. Such techniques are referred to generally as cryptographic assurance methods, and include the use of both symmetric and asymmetric keys as well as digital signatures and hash algorithms. The practice of using cryptographic protocols to ensure the authenticity of the identities of parties transmitting messages as well as the integrity of messages is well known in the art and need not be described here in detail. Accordingly, one of ordinary skill in the art may refer to Bruce Schneier, Applied Cryptography, Protocols, Algorithms, And Source Code In C, (2d Ed, John Wiley & Sons, Inc., 1996). The use of various encryption techniques are described in the above-referenced parent application, as are other methods for ensuring the authenticity of the identities of parties transmitting messages. In addition, the present invention provides for the anonymity of both clients and respondents, as is also described in detail in the above-referenced parent application.

Figure 2:
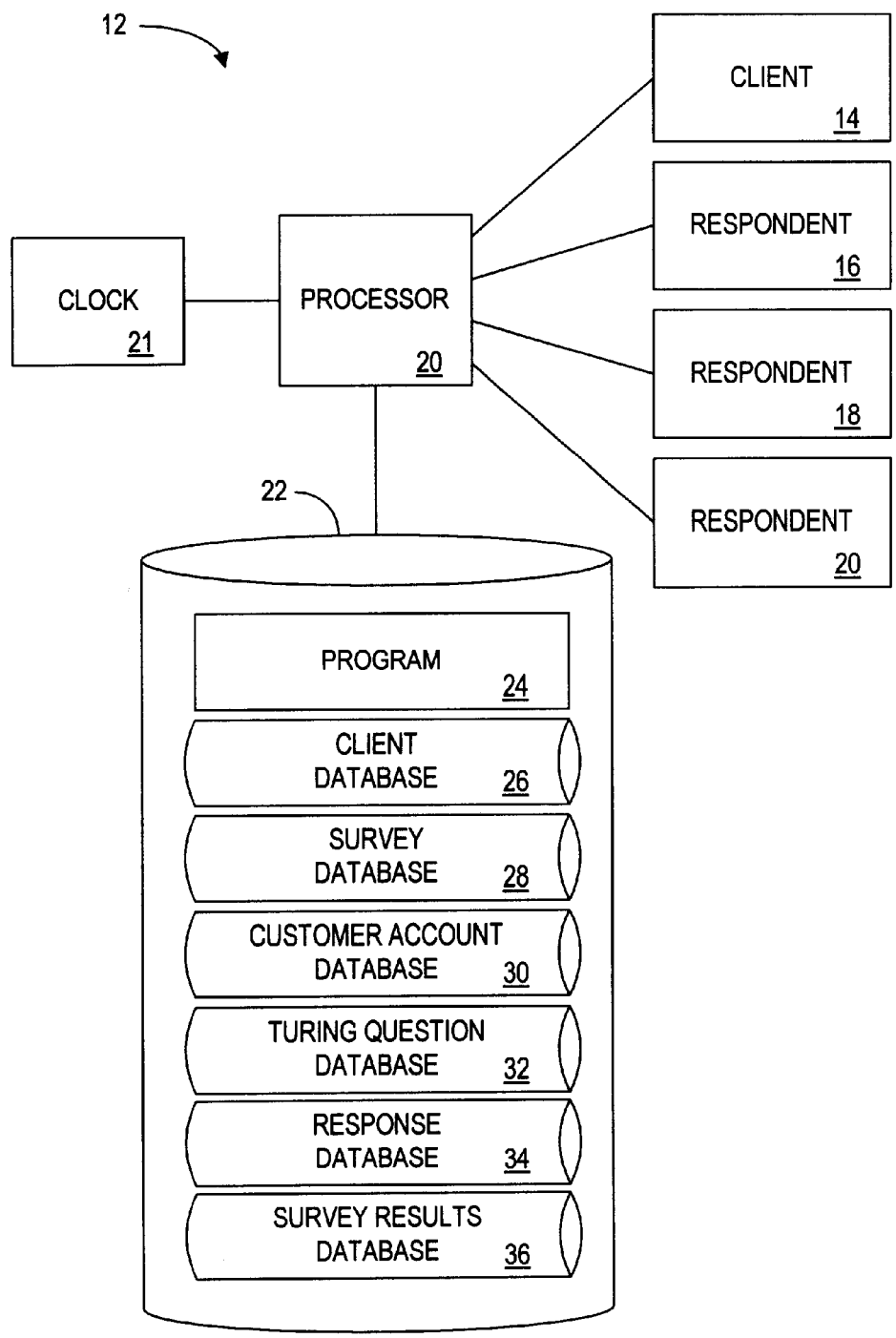
FIG. 2 is a schematic illustration of a controller of the apparatus of FIG. 1.

Referring to FIG. 2, the controller 12 of FIG. 1 comprises a processor 20, which may be one or more conventional microprocessors such as the Intel® Pentium® or the Sun Microsystems 166 MHz UltraSPARC-I. The processor 20 is in communication with a clock 21 and a data storage device 22 such as an appropriate combination of magnetic, optical and/or semiconductor memory. The processor 20, clock 21 and the storage device 22 may each be (i) located entirely within a single computer or other computing device; (ii) in communication with each other by a remote communication medium such as a serial port cable, telephone line or radio frequency transceiver; or (iii) a combination thereof. For example, the controller 12 may comprise one or more computers that are in communication with a remote server computer for maintaining databases.

The clock 21 generates signals indicative of the current time, thereby allowing the processor 20 to measure the time elapsed between events. The storage device 22 stores a program 24 for controlling the processor 20. The processor 20 performs instructions of the program 24 and thereby operates in accordance with the present invention, and particularly in accordance with the methods described in detail herein. The program 24 furthermore includes program elements that may be necessary, such as an operating system and "device drivers" for allowing the processor 20 to interface with computer peripheral devices, such as a keyboard (or other input device) and video monitor (not shown). Appropriate device drivers and other necessary program elements are known to those skilled in the art and thus need not be described in detail herein.

The storage device 22 also stores (i) a client database 26, (ii) a survey database 28, (iii) a customer account database 30, (iv) a certification question database 32, (v) a response database 34, and (vi) a survey results database 36. The databases 26, 28, 30, 32, 34 and 36 are described in detail below and depicted with exemplary entries in the accompanying figures. As will be understood by those skilled in the art, the schematic illustrations of and accompanying descriptions of the databases presented herein are exemplary arrangements for stored representations of information. A number of other arrangements may be employed besides those represented by the tables shown. Similarly, the illustrated entries represent exemplary information, but those skilled in the art will understand that the number and content of the entries can be different from those illustrated herein.

Referring to FIG. 3, a table 300 represents an embodiment of the client database 26 of FIG. 2. The table 300 includes rows 302, 304 and 306, each of which represents an entry of the client database 26. Each entry defines a client, which is an entity that has the controller 12 (FIG. 1) conduct surveys on its behalf. In particular, each entry includes (i) a client identifier 308 that uniquely identifies the client, (ii) a client name 310, (iii) a client address 312, (iv) billing information 314 that specifies how the client is to be charged for surveys conducted on its behalf, and (v) a preferred method of delivering survey results 316.

The data stored in the client database 26 may be received from the client device 14 (FIG. 1). For example, an entity may use the client device 14 to access a site on the World Wide Web ("Web") where it registers to become a client. The appropriate data would be requested and entered via that site, communicated to the controller 12 (FIG. 1), and stored in a newly-created entry of the client database 26.

Figure 4:
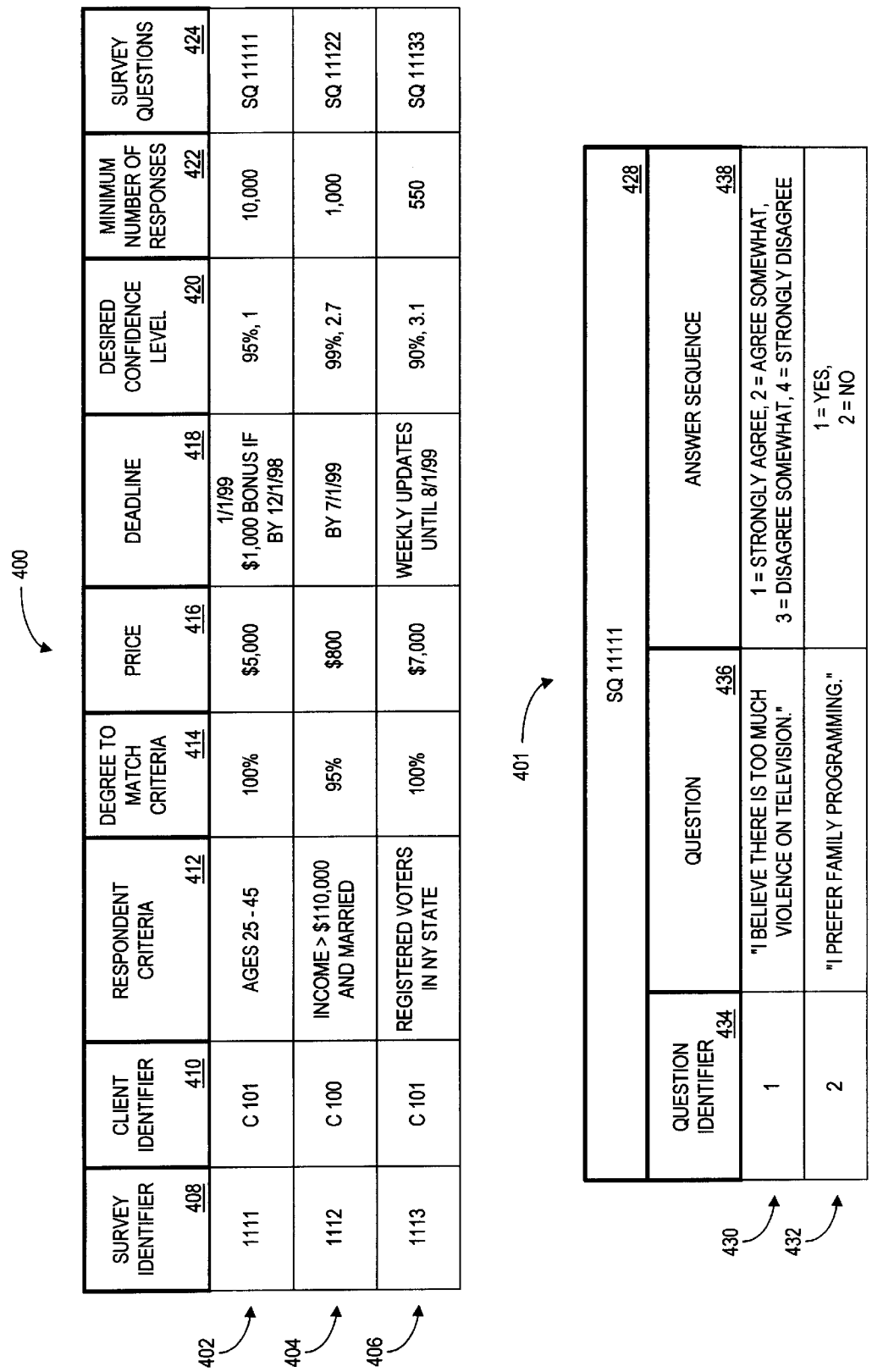
FIG. 4 is a schematic illustration of a survey database of the controller of FIG. 2.

Referring to FIG. 4, tables 400 and 401 collectively represent an embodiment of the survey database 28 of FIG. 2. The table 400 includes rows 402, 404 and 406, each of which represents an entry that defines a survey that is to be conducted on behalf of a client. In particular, each entry includes (i) a survey identifier 408 for uniquely identifying the survey, (ii) a client identifier 410 for indicating the client on whose behalf the survey is conducted, (iii) respondent criteria 412 that specify the types of respondents whose responses are desired, (iv) a degree 414 to which the respondent must match the specified respondent criteria, (v) a price 416 paid by the client in return for having the survey conducted, (vi) a deadline 418 by which the responses to the survey must be assembled and provided to the client, (vii) a desired confidence level 420 of the survey results which includes a percentage and an offset, (ix) a minimum number of responses 422, and (x) an indication of the survey questions 424.

The desired confidence level includes a percentage that is the probability that the true average associated with a question is within a predefined interval. The interval is in turn defined as an interval from one offset less than the sample average (defined by the average of the received responses) to one offset greater than the sample average. For example, if a survey question is "What is the best age to start having children?", then the sample average (based on the received responses) might be the age "27". If the confidence level percentage is 95% and the offset is 1.0 years, then the desired confidence level is achieved if it is determined that the true average age has a 95% probability of being in the interval from "26" (27−1) to "28" (27+1). Calculating a confidence level is described in "Introduction to Statistics", by Susan Wagner, published by Harper Perennial, 1992.

A table such as the table 401 would typically exist for each entry of the table 400. The table 401 includes an identifier 428 which corresponds to an indication of the survey questions of the table 400 and which uniquely identifies the survey questions represented thereby. The table 401 also includes rows 430 and 432, each of which defines a survey question. In particular, each entry includes (i) a question identifier 434 that uniquely identifies the survey question of the table 401; (ii) a question description 436, which may be in the form of text, graphical image, audio or a combination thereof; and (iii) an answer sequence 438 defining possible responses which the respondent may select, and an order of those responses. In certain embodiments of the present invention, the survey question may not have an answer sequence, but may instead allow the respondent to provide a "free form" response comprising, for example, text he types or audio input he speaks. For example, for a survey question "What is your favorite name for a boy?" the respondent may be allowed to type his favorite name in his response.

As illustrated above, the respondent criteria specify the types of respondents whose responses to the survey questions are desired. In another embodiment, each survey question may include associated respondent criteria. Thus, different questions of a survey could be targeted to differed types of respondents. Similarly, each survey question may also specify a deadline, a desired confidence level, and/or a minimum number of responses.

Figure 5:
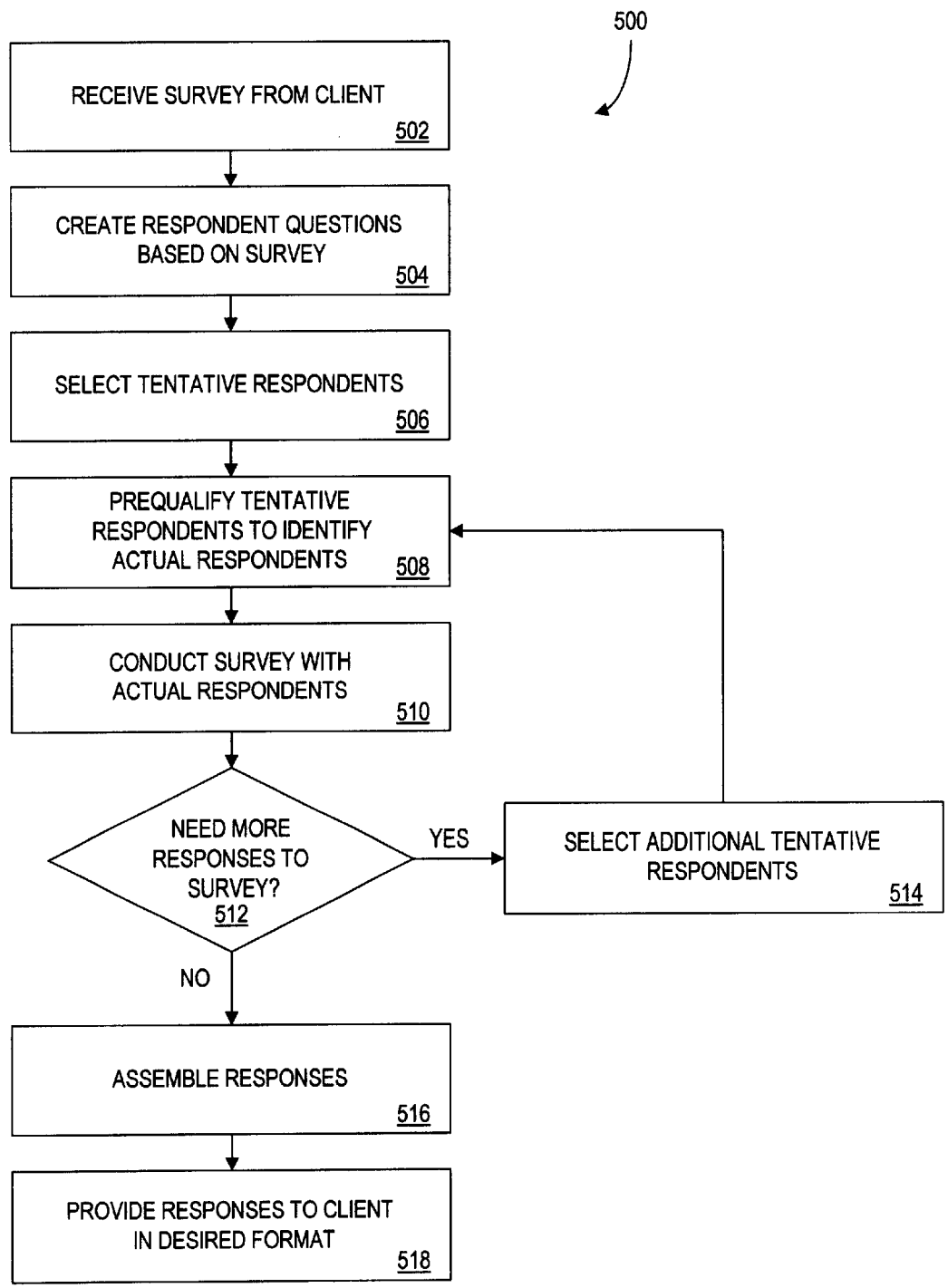
FIG. 5 is a flow chart illustrating a method for conducting a survey on behalf of a client.

Referring to FIG. 5, a method 500 is performed by the controller 12 (FIG. 1) for conducting a survey on behalf of a client. The controller 12 receives a survey from the client (step 502). The survey includes survey questions as well as other data such as respondent criteria, indicated above with respect to FIG. 4. The survey may be received from the client device 14 (e.g. a computer accessing a site on the Web). The appropriate data would be requested and entered via that site and communicated to the controller 12 (FIG. 1). Alternatively, the survey may be entered into the controller 12 via an input device in communication therewith, as will be understood by those skilled in the art. The controller 12 creates respondent questions based on the survey questions (step 504), as is described in detail below. Tentative respondents are selected (step 506). Although the tentative respondents may meet the respondent criteria, it can be desirable to assure further that the respondents meet other criteria. For example, a respondent profile may only include data volunteered by each respondent with no assurance that the data is accurate. Accordingly, the tentative respondents are prequalified (step 508) in order to identify actual respondents that will participate in the survey.

Prequalifying the tentative respondents may include transmitting qualification questions to each tentative respondent. The qualification questions may define, for example, a test of English language competency or a test for familiarity with luxury vehicles. Responses to the qualification questions are received, and a qualification test is applied to the responses to generate a qualification test result. Based on the qualification test result a set of actual respondents is selected (e.g. respondents with at least a particular level of English language competency).

The survey is then conducted with the actual respondents (step 510) in a manner described in detail below. If still more responses are required (step 512), as may be true to satisfy a minimum number of respondents or a desired confidence level, then additional tentative respondents are selected (step 514). It may also be necessary to select additional tentative respondents if the previous respondents do not represent an accurate sampling of a desired population. It may also be necessary to select additional tentative respondents based on responses received. For example, a majority of Connecticut respondents may provide a certain response, so additional respondents from New England are desired. Additional tentative respondents may also be selected if a desired set of responses is not achieved. For example, a client may require that at least 80% of respondents provide the same response. If there is no such majority response, additional respondents are desired. If no more responses are required, then the responses are assembled (step 516) and provided to the client in a desired format (step 518).

Respondent questions may be transmitted via electronic mail to an electronic mail address corresponding to the respondent. Such transmission does not require the respondent to be logged on when the respondent question is transmitted. Alternatively, the controller 12 may transmit a program to the respondent device and direct the respondent device to run the program. The program may be, for example, a java applet or application program that presents the respondent questions to the respondent, receives the corresponding responses and transmits the responses to the controller 12.

Referring to FIG. 6, a table 600 represents an embodiment of the customer account database 30 of FIG. 2. The table 600 includes rows 602, 604 and 606, each of which represents an entry of the customer account database 30. Each entry defines a customer profile of a party having an account, such as an account with an online service provider. Those skilled in the art will understand that in other embodiments the entries of the customer account database 30 may define parties having other types of accounts, such as bank accounts or casino-based frequent player accounts. Some customers represented by the customer account database 30 may be solicited to participate in surveys, and thereby become respondents.

Each entry includes (i) an account identifier 608 that uniquely identifies the customer, (ii) a customer name 610, (iii) a customer address 612, (iv) the gender 614 of the customer, (v) the birth date 616 of the customer, (vi) an electronic mail address 618 of the customer, (vii) a public key 620 of the customer for use in cryptographic applications, (viii) an indication of whether the customer is willing to participate in surveys 622, (ix) a rating 624 that is based on past survey participation of the customer, (x) the number of successfully completed surveys 626, and (xi) additional features 628 of the customer profile. Those skilled in the art will understand that many different types of information may be stored for each customer profile.

The data stored in the customer account database 30 may be received from the respondent devices. For example, an entity may use a respondent device to access a site on the Internet where it registers (e.g. to become a customer of an online service provider). The appropriate data would be requested and entered via that site, communicated to the controller 12 (FIG. 1), and stored in a newly-created entry of the customer account database 30.

Figure 7A:
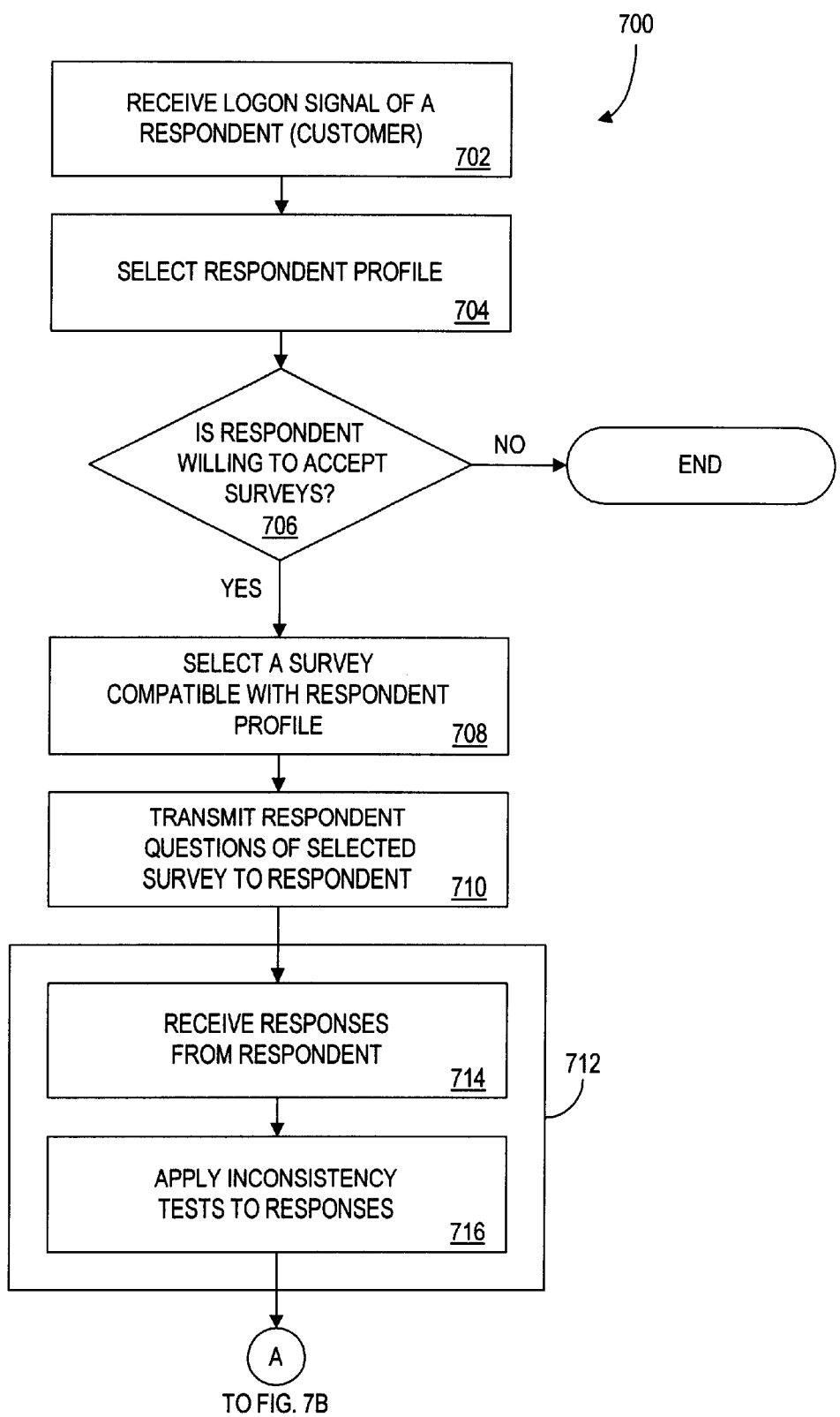
FIGS. 7A and 7B are a flow chart illustrating a method for directing a respondent that is participating in a survey.
Figure 7B:
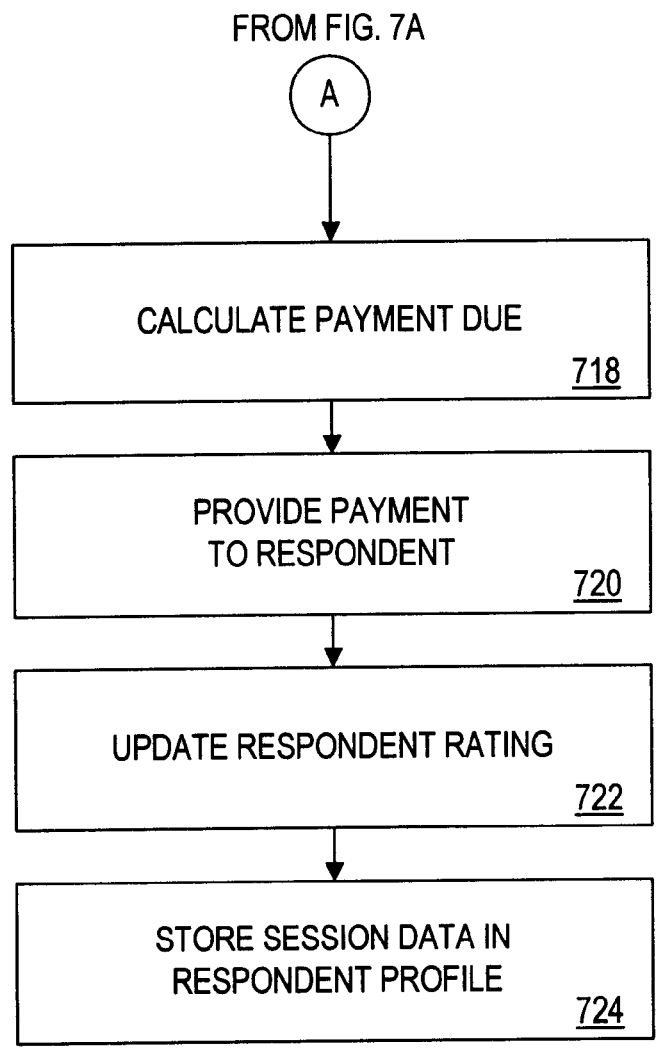

Referring to FIGS. 7A and 7B, a method 700 is performed by the controller 12 (FIG. 1) in directing a respondent that is participating in a survey. The method 700 is primarily directed to a respondent that connects ("logs on") to the controller 12 or to another device in communication with the controller 12. For example, if the controller 12 is operated by an online service provider, then the controller 12 can identify each respondent device that begins a communication session therewith (e.g. to connect the respondent device to the Internet via the controller 12).

The controller 12 receives a log-on signal (step 702) that indicates that a customer (a potential respondent) has logged on. In response, the controller 12 selects the customer profile corresponding to the indicated customer (step 704). For example, the log-on signal may include an account identifier that indicates an entry of the customer account database 30 of FIG. 2. The entry in turn defines a customer profile which serves as a respondent profile if the indicated customer chooses to become a respondent of a survey.

If the customer profile indicates that the customer is willing to participate in surveys (step 706), then the controller 12 selects a survey that is compatible with the respondent profile (step 708). For example, a particular survey may be directed to parties between the ages of twenty-five and forty-five. This survey would be compatible if the corresponding birth date of the respondent profile indicates that the respondent is between the ages of twenty-five and forty-five. Alternatively, the customer may be allowed to select from a list of surveys in which he may participate (i.e. compatible surveys).

The respondent questions of the selected survey are transmitted to the respondent (step 710). As described in detail below, the respondent questions of a survey are based on (but may differ from) corresponding survey questions. Reference numeral 712 indicates steps in which data is received from the respondent. In general, the controller 12 receives responses from the respondent (step 714) and applies one or more inconsistency tests to the responses (step 716). The steps 714 and 716 may be repeated, as necessary. Each of the steps 714 and 716 are described in further detail below.

In one embodiment the controller 12 may transmit all respondent questions and then await responses thereto. In another embodiment the controller 12 may transmit respondent questions one at a time and await a response thereto before transmitting the next respondent question. The latter-described embodiment is advantageous when certain respondent questions are to be only transmitted depending on the responses received to previous respondent questions. Accordingly, it will be understood by those skilled in the art that when reference is made to transmitting questions and receiving responses, either embodiment is acceptable.

After all responses have been received from the respondent, the controller 12 calculates the payment due (step 718) and provides that payment to the respondent (step 720). The above-referenced parent application describes several methods for transferring payments. Those methods are applicable to the payment from client as well as payment to respondents. In addition, the respondent rating is updated (step 722) to reflect the responses received during the session, and other session data is stored in the corresponding respondent profile (step 724). For example, the respondent rating may be selected from a set of predefined ratings: "gold" if he answered more than fifty surveys successfully and without a fraud signal being generated, "normal" otherwise. Other types of ratings and rating criteria will be understood by those skilled in the art.

Referring to FIG. 8, a table 800 represents an embodiment of the certification question database 32. The certification question database 32 includes entries 802 and 804, each of which defines a certification question (a question for determining whether a respondent is a computer, is not paying attention or otherwise may not provide responses that are useful to the client). The use of certification questions in surveys conducted via computer networks is advantageous because their use can help identify responses that originate from computers or humans not paying attention to the question. Without such questions, it would be difficult to determine whether received responses constituted useful data.

Each entry includes (i) a certification question identifier 806 that uniquely identifies the certification question, (ii) a certification question description 808 which may include text of the question, (iii) an answer sequence 810 that defines possible responses which the respondent may select and an order of those responses, and (iv) the proper answer 812 to the certification question.

The certification question database 32 is updated periodically so that new certification questions are added. Older certification questions may also be deleted periodically if desired. Adding new certification questions makes it extremely difficult for an unscrupulous party to design a program that automatically provides the proper answers to certification questions. There can be certification questions which stay the same, but for which the proper response changes frequently (e.g. "what was the big new event today?"). Certification questions need not be an interrogative but nonetheless invite a reply (e.g. "Answer (b) to this question").

Figure 9:
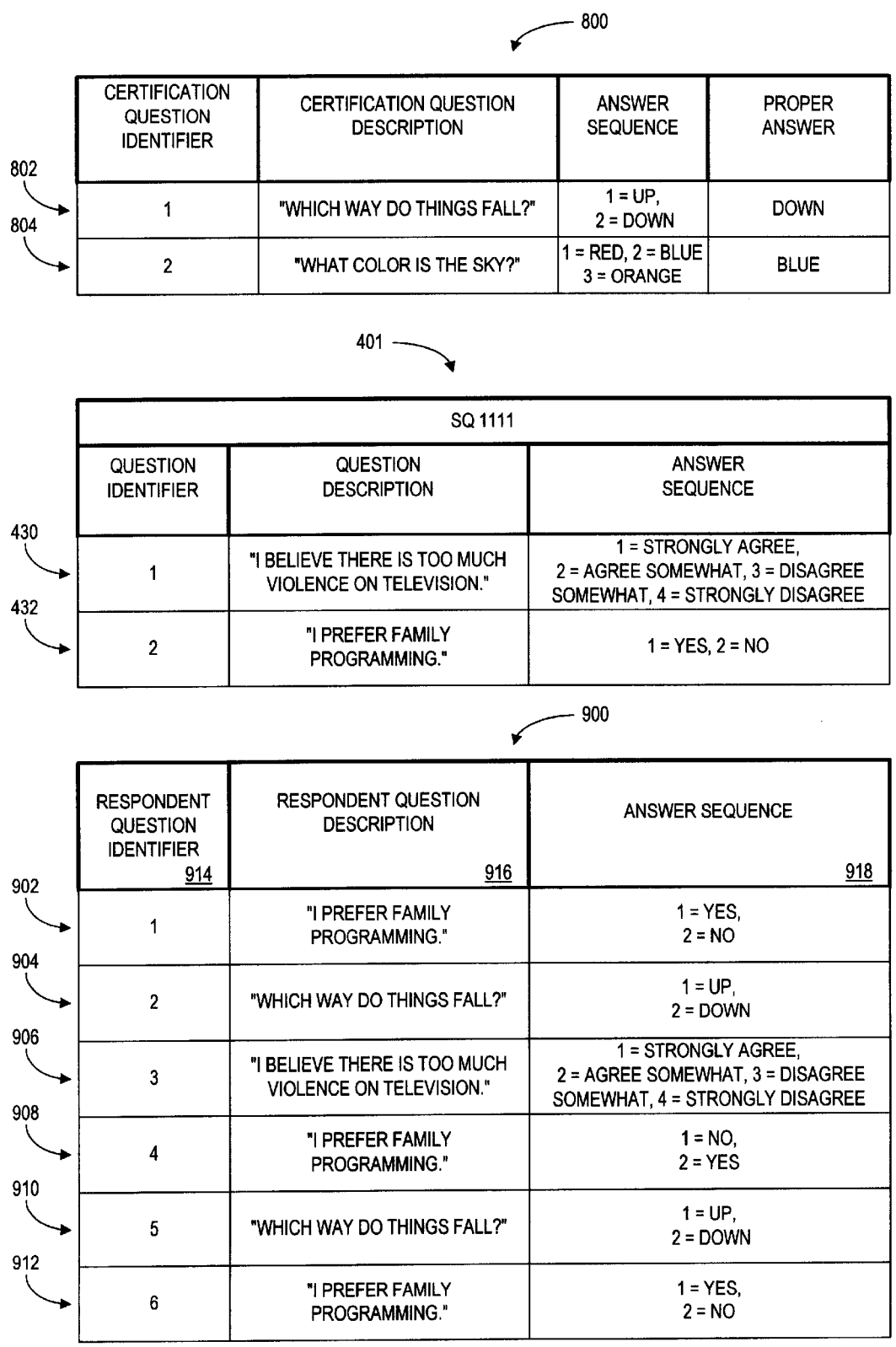
FIG. 9 is a schematic illustration of the survey database and the certification question database of FIGS. 4 and 8, respectively.

Referring to FIG. 9, the table 800 which defines certification questions and the table 401 which defines survey questions are illustrated again with an exemplary set of respondent questions generated therefrom. Each respondent question is created based on one or more survey questions, one or more certification questions, or a combination thereof.

A table 900 represents a plurality of respondent questions. The table 900 includes entries 902, 904, 906, 908, 910 and 912, each defining a respondent question. Each entry includes (i) a respondent question identifier 914 that uniquely identifies the respondent question, (ii) a respondent question description 916, and (iii) an answer sequence 918.

A plurality of respondent questions may be based on the same survey question or certification question. For example, the entries 904 and 910 represent respondent questions that are each based on the certification question represented by the entry 802. If a plurality of respondent questions are based on the same survey question or certification question, then the corresponding responses should match if the respondent is human and paying attention. As used herein, responses are deemed to match if they each define the same answer, even if the answer sequences of the corresponding questions are not identical. For example, if a first answer sequence is "1=yes, 2=no" and a second answer sequence is "1=no, 2=yes", then the responses match if both responses are "no" (or if both responses are "yes"). In addition, if the respondent questions are based on a certification question, then the responses should also match the corresponding proper answer of the certification question. An inconsistency test would be applied to assure that the responses to certification-based questions match the corresponding proper answer of the certification question.

A respondent question may include an answer sequence that is identical to or different from the answer sequence of the survey question or certification question on which it is based. For example, the entry 902 represents a respondent question that is based on the survey question represented by the entry 432. The answer sequence defined by the entry 902 is identical to the answer sequence defined by the entry 432. Similarly, the entry 908 represents a respondent question that is also based on the survey question represented by the entry 432. However, the answer sequence defined by the entry 908 is different from the answer sequence defined by the entry 432. Thus, a respondent that provides random or otherwise meaningless responses will be unlikely to provide responses that are consistent. For example, if a respondent always selects the first response of the answer sequence, he cannot provide consistent responses to a plurality of respondent questions with different answer sequences.

As described below, a respondent question based on a certification question may be created and transmitted to a respondent along with respondent questions that are based on survey questions. In some embodiments it can be desirable to transmit such certification-based respondent questions only after receiving an indication (hereinafter a "warning sign") that the responses may be from a computer or from a human that is not paying attention.

Figure 10:
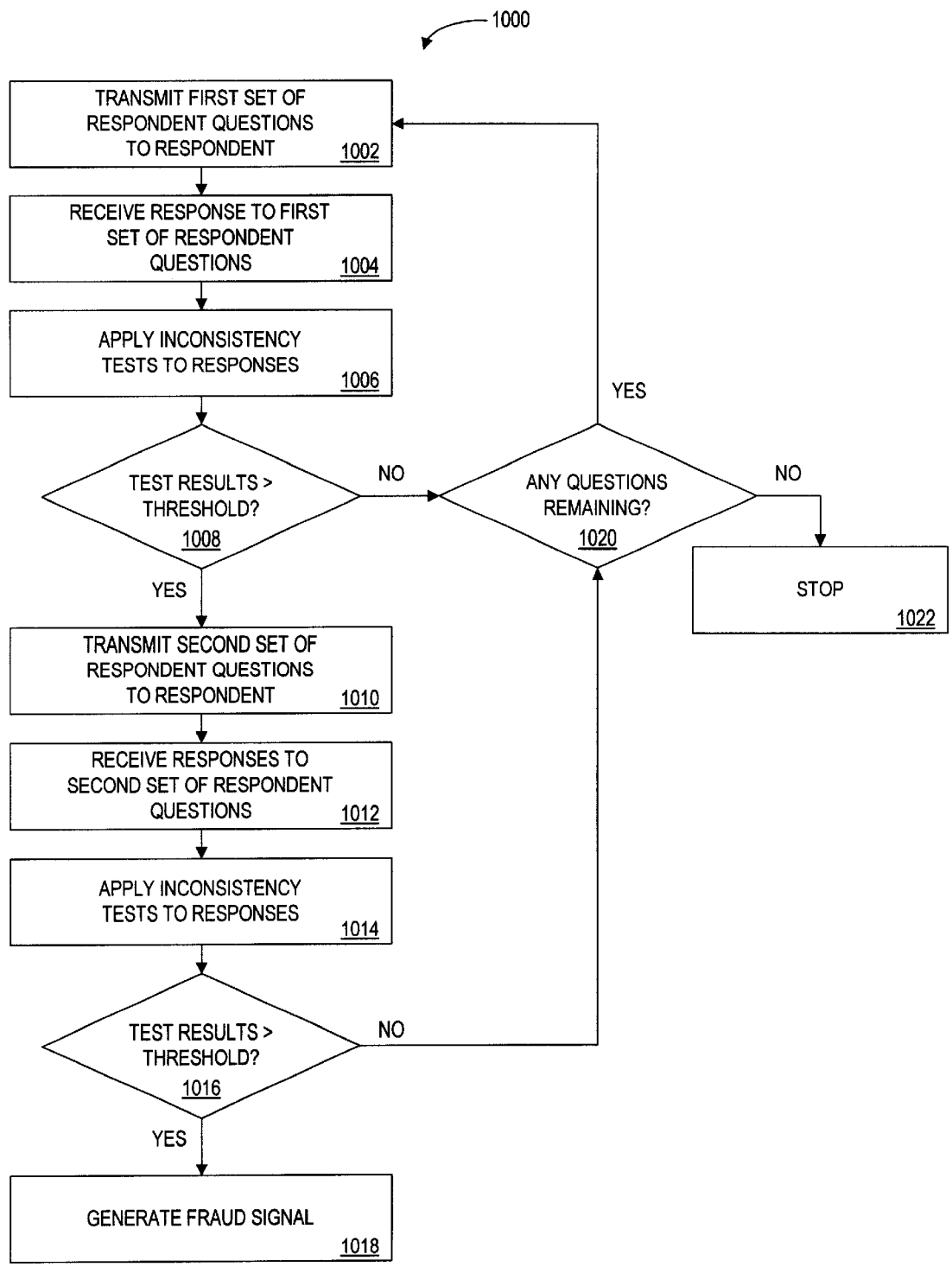
FIG. 10 is a flow chart illustrating a method for interacting with a respondent in conducting a survey.

Referring to FIG. 10, a method 1000 is performed by the controller 12 (FIG. 1) in transmitting respondent questions to a respondent and receiving responses to those respondent questions. The controller 12 transmits a first set of respondent questions to the respondent (step 1002) and receives responses to the first set of respondent questions (step 1004). The controller applies an inconsistency test to the responses to generate an inconsistency test result (step 1006). Several types of inconsistency tests are described in detail below.

Based on the inconsistency test result, it is determined whether a warning sign is indicated (step 1008). For example, it may be determined whether the inconsistency test results are greater than a predetermined threshold. If so, then a second set of respondent questions are transmitted to the respondent (step 1010), and corresponding responses thereto are received (step 1012). The controller then applies an inconsistency test to these responses to generate another inconsistency test result (step 1014). If this inconsistency test result indicates a warning sign (step 1016), then a fraud signal is generated (step 1018). As described below, various actions may be performed upon generation of a fraud signal.

If both inconsistency test results do not indicate a warning sign, then it is determined whether there are any respondent questions remaining (step 1020). If so, then those respondent questions are transmitted to the respondent, as described above (step 1002). Otherwise, the controller stops transmitting respondent questions to the respondent (step 1022).

Figure 11A:
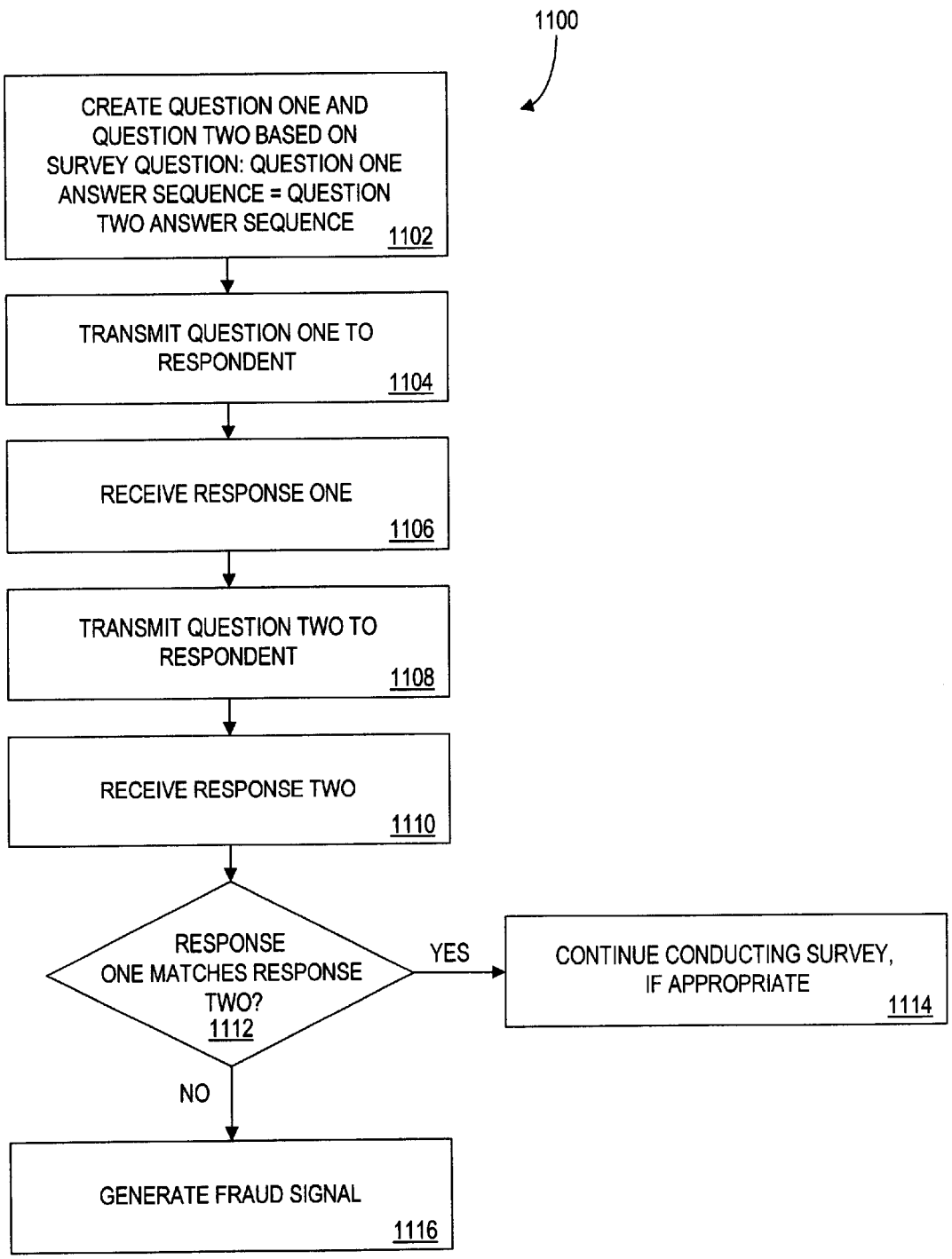
FIG. 11A is a flow chart illustrating a first method for applying an inconsistency test to responses.

Referring to FIG. 11A, the controller 12 (FIG. 1) may apply a first inconsistency test to responses by comparing the responses of identical respondent questions. At step 1102 of the method 1100, the controller creates a first question ("question one") and a second question ("question two") based on a single survey question. Question one and question two define the same answer sequence. Those skilled in the art will understand that question one and question two may instead be based on a certification question.

Question one is transmitted to the respondent (step 1104), and a corresponding response ("response one") is received (step 1106). Similarly, question two is transmitted to the respondent (step 1108), and a corresponding response ("response two") is received (step 1110). If response one matches response two (step 1112), then the controller continues conducting the survey, if appropriate (step 1114). Otherwise, a fraud signal is generated (step 1116).

Figure 11B:
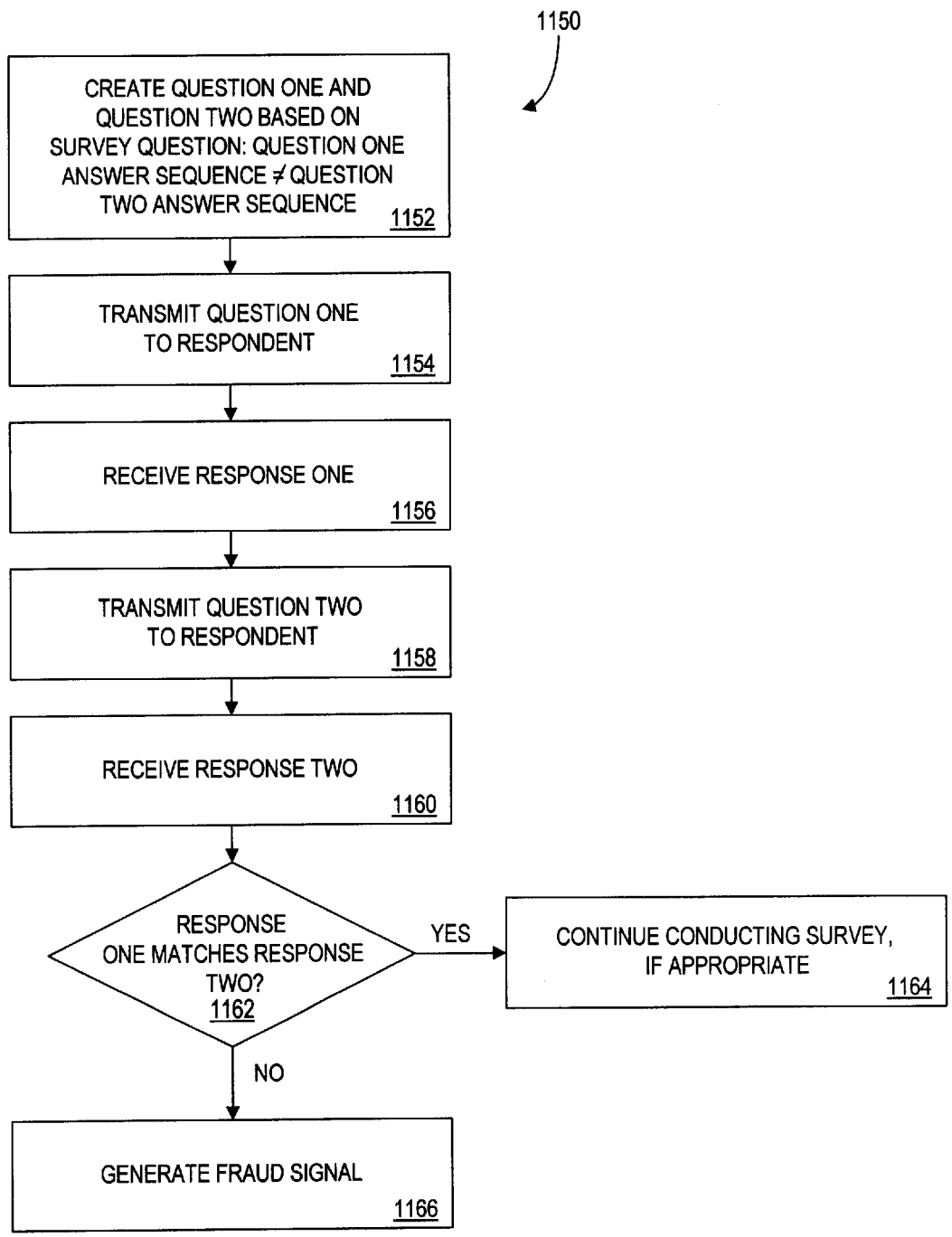
FIG. 11B is a flow chart illustrating a second method for applying an inconsistency test to responses.

Referring to FIG. 11B, the controller 12 (FIG. 1) may apply a second inconsistency test to responses by comparing the responses to respondent questions that are based on the same survey question but that have different answer sequences. At step 1152 of the method 1150, the controller creates a first question ("question one") and a second question ("question two") based on a single survey question. Those skilled in the art will understand that question one and question two may instead be based on a certification question.

Question one is transmitted to the respondent (step 1154), and a corresponding response ("response one") is received (step 1156). Similarly, question two is transmitted to the respondent (step 1158), and a corresponding response ("response two") is received (step 1160). If response one matches response two (step 1162), then the controller continues conducting the survey, if appropriate (step 1164). Otherwise, a fraud signal is generated (step 1166).

Figure 12:
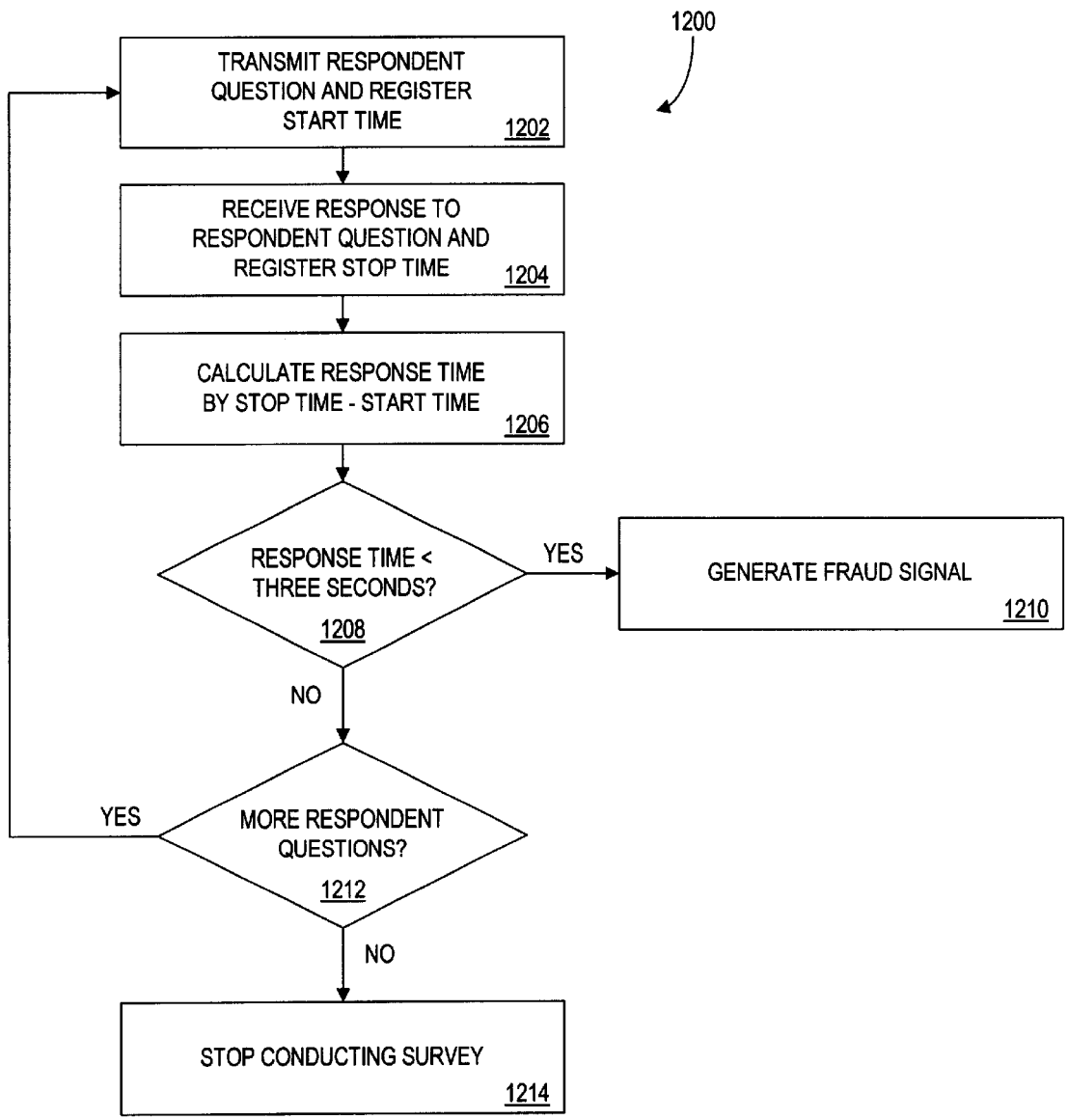
FIG. 12 is a flow chart illustrating a third method for applying an inconsistency test to responses.

Referring to FIG. 12, a method 1200 is performed by the controller 12 (FIG. 1) in applying a third inconsistency test to responses. In particular, the controller 12 measures the time it takes a respondent to provide a response. If the response is provided too quickly, it likely indicates that the respondent has not read the question before responding or that the respondent is a computer.

The controller 12 transmits a respondent question and registers the time thereof, called a "start time" (step 1202). Then, a response to the respondent question is received, and the time of receipt ("stop time") is registered (step 1204). The response time of the respondent is calculated as the difference between the stop time and the start time (step 1206). If the response time is less than a predetermined threshold (step 1208), then a fraud signal is generated (step 1210). Although the predetermined threshold illustrated in FIG. 12 is the exemplary value "three seconds", those skilled in the art will understand that other values may be used. Otherwise, it is determined whether there are more respondent questions (step 1212). If so, then the controller 12 continues transmitting those respondent questions (step 1202). If not, then the controller 12 stops conducting the survey with this respondent (step 1214).

Figure 13A:
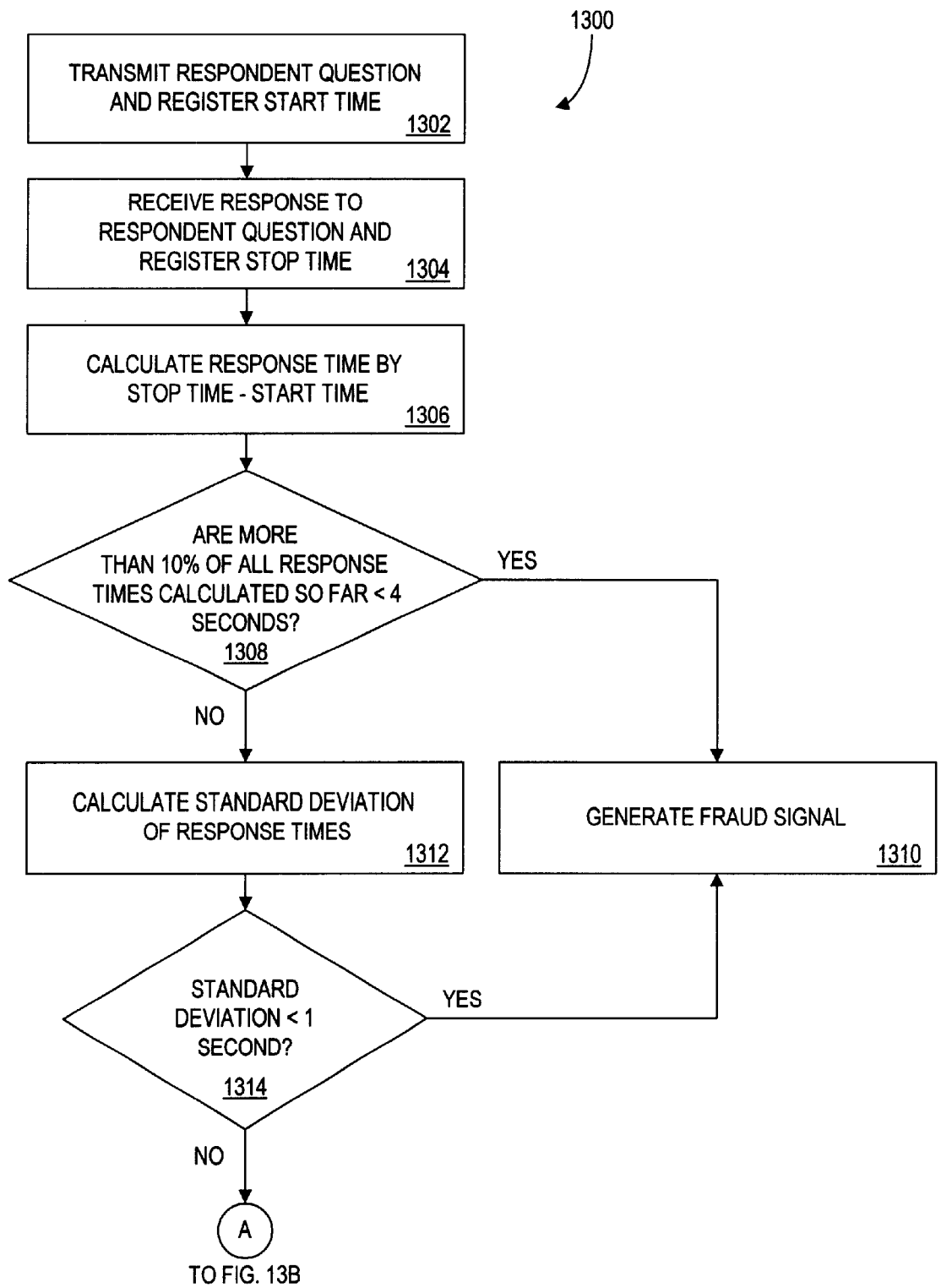
FIGS. 13A and 13B are a flow chart illustrating a fourth method for applying an inconsistency test to responses.
Figure 13B:
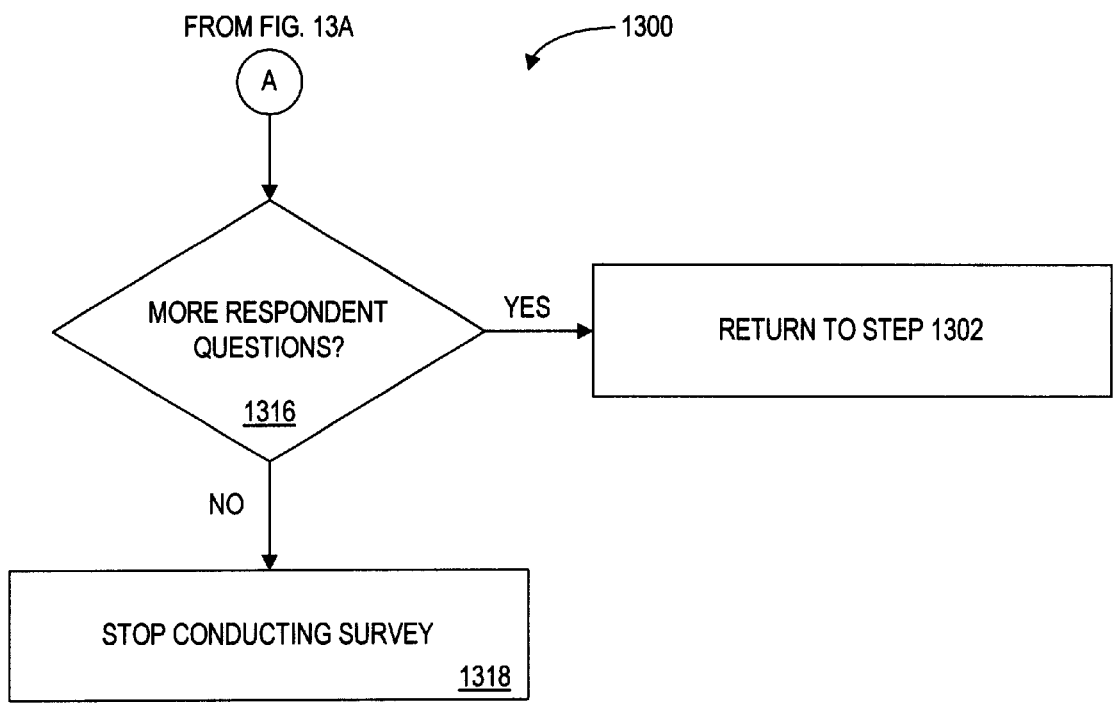

Referring to FIGS. 13A and 13B, a method 1300 is performed by the controller 12 (FIG. 1) in applying a fourth inconsistency test to responses. In particular, the controller 12 measures the time it takes a respondent to provide responses to a plurality of respondent questions. If the response time does not vary significantly, then it likely indicates that the respondent is a computer or a human that is not paying attention.

The controller 12 transmits a respondent question and registers the start time (step 1302). Then, a response to the respondent question is received, and the stop time is registered (step 1304). The response time is calculated as the difference between the stop time and the start time (step 1306). If more than a predetermined percentage of the response times are less than a predetermined threshold (step 1308), then a fraud signal is generated (step 1310). Although in FIG. 13 exemplary values are illustrated for the predetermined percentage (10%) and the predetermined threshold (four seconds), those skilled in the art will understand that other values may be used as desired. Those skilled in the art will also understand that a respondent device, rather than the controller 12, may register the start time and stop time and calculate the response time.

Otherwise, the standard deviation of the response times is calculated (step 1312). If the standard deviation is below a predetermined threshold (step 1314), then a fraud signal is generated (step 1310). Otherwise, it is determined whether there are more respondent questions to be answered (step 1316). If so, those respondent questions are transmitted to the respondent (step 1302). If not, then the controller 12 stops conducting the survey with this respondent (step 1318).

Figure 14:
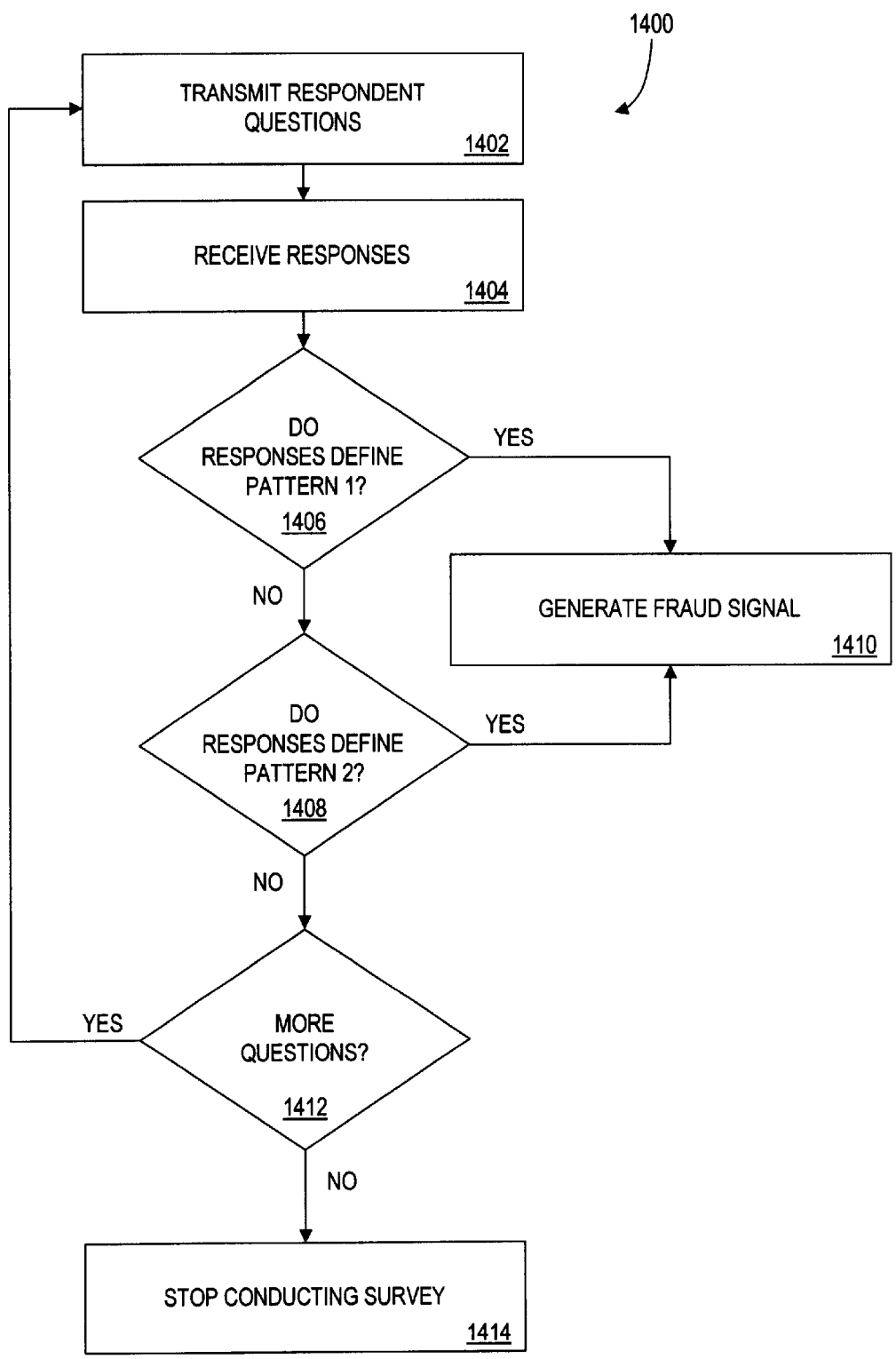
FIG. 14 is a flow chart illustrating a fifth method for applying an inconsistency test to responses.

Referring to FIG. 14, a method 1400 is performed by the controller 12 (FIG. 1) in applying a fifth inconsistency test to responses. In particular, the controller 12 determines whether the responses define a predetermined pattern (e.g. all responses are the first response choice). If the responses define a predetermined pattern, then it likely indicates that the respondent is a computer or a human that is not paying attention.

The controller 12 transmits respondent questions (step 1402), and receives responses thereto (step 1404). If the responses define a first pattern (step 1406) or define a second pattern (step 1408), then a fraud signal is generated (step 1410). The controller may test to see if the responses define any number of predetermined patterns. If there are more respondent questions (step 1412), then those respondent questions are transmitted to the respondent (step 1402). Otherwise, the controller 12 stops conducting the survey with this respondent (step 1414).

When a fraud signal is generated, the controller may ignore the responses received from the corresponding respondent. In addition, if a fraud signal is generated, payment to the respondent may be reduced or eliminated, the respondent may be sent a message of reprimand, and/or the respondent may be barred from future participation in surveys. The rating of a respondent may likewise reflect the generation of a fraud signal. Similarly, the client may be informed that certain responses were accompanied by a fraud signal. The client may be offered a reduced price if he accepts these responses in the assembled survey results. In one embodiment, payment due to the respondent accrues until it is paid to the respondent at predetermined times (e.g. once per month). In this embodiment, the fraud signal can prevent accrued payment from being paid to the respondent. Generation of a fraud signal can thus prevent the respondent from receiving the payment from several surveys. Accordingly, the respondent has a strong incentive to avoid actions that may generate a fraud signal.

It can be further desirable to "mix" questions from a plurality of surveys and present those questions to a respondent. Thus, the respondent may participate in a plurality of surveys substantially simultaneously. This is advantageous in that it makes it more difficult to develop of program that can repeatedly respond to a single survey.

Figure 15:
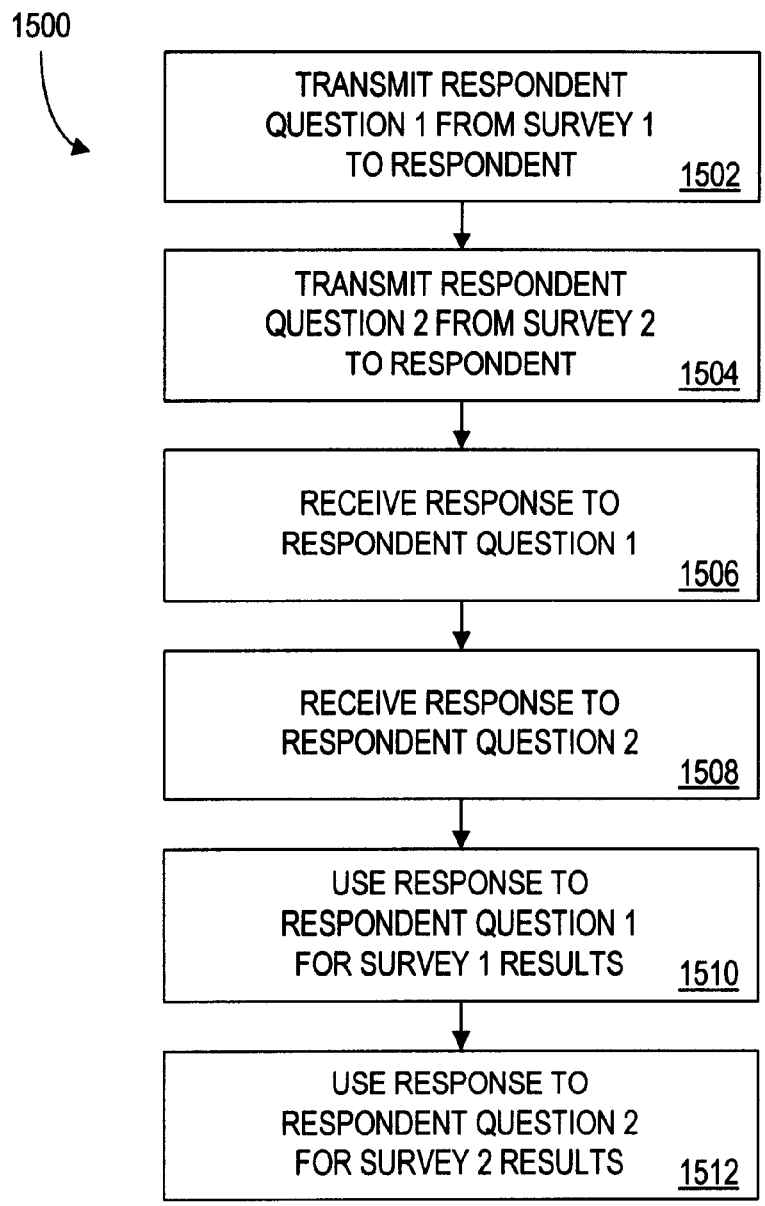
FIG. 15 is a flow chart illustrating a method for creating a set of respondent questions from the survey questions of a plurality of surveys.

Referring to FIG. 15, a method 1500 is performed by the controller 12 (FIG. 1) in directing a respondent to participate in more than one survey substantially simultaneously. In the flow chart of FIG. 15, a respondent may participate in two surveys. Of course, more than two surveys are possible as well. A plurality of surveys may be selected based on an amount of time. For example, the respondent may specify an amount of time he would like to spend answering questions. Based on the specified amount of time, one or more surveys are used in generating respondent questions for the respondent. Alternatively, the surveys may be selected based on, for example, surveys that must be conducted within the shortest amount of time.

The controller 12 transmits to the respondent a first respondent question from a first survey (step 1502) and a second respondent question from a second survey (step 1504). The controller 12 in turn receives a response to the first respondent question (step 1506) and a response to the second respondent question (step 1508). The response to the first respondent question is used for the first survey (step 1510), and the response to the second respondent question is used for the second survey (step 1512). As described above, the actual order of transmitting respondent questions and receiving responses may vary. For example, both respondent questions may be transmitted before any responses are received. Alternatively, the second respondent question may not be transmitted until the first response is received.

Referring to FIG. 16, a table 1600 represents an embodiment of the response database 34 (FIG. 2). The responses received from respondents are stored in the response database 34, where they may be assembled, analyzed and otherwise utilized for clients. The received responses may be stored in the response database 34 indefinitely. Alternatively, the received responses may be purged after a predetermined amount of time or when additional storage space is required.

The table 1600 includes entries 1602 and 1604, each defining a received response. In particular, each entry includes (i) a respondent identifier 1606 that identifies the respondent providing the response, and which corresponds to an account identifier of the customer account database 30 (FIG. 2), (ii) a survey identifier 1608 that identifies the survey and which corresponds to a survey identifier of the survey database 28, (iii) a question identifier 1610 that identifies the respondent question and that corresponds to a respondent question identifier as described above with reference to FIG. 9, (iv) a response 1612 received from the respondent, and (v) a date and time 1614 that the response was received.

Referring to FIG. 17, a table 1700 represents a record of the survey results database 36 (FIG. 2). The record is identified by a survey identifier 1702, which corresponds to a survey identifier of the survey database 28. The table also includes an indication of the number of responses received 1704 for this survey and an indication of the actual confidence level 1706 of the received responses. Calculating a confidence level based on a set of received responses is described in the above-cited book "Introduction to Statistics".

The table 1700 also includes entries 1708 and 1710, each of which defines the results in summary form of the responses received for a survey question. Each entry includes (i) a question identifier 1712 that uniquely identifies the survey question, and which corresponds to a survey question identifier of the survey database 28 (FIG. 2); and (ii) responses 1714 to the survey question in summary form. Many ways of summarizing the received responses will be understood by those skilled in the art. In addition, the client may specify a preferred format for the summary.

In one embodiment, each of a plurality of survey questions included in a survey may be assigned a priority. Such an embodiment allows a client to specify which types of information he is most interested in (i.e. subjects addressed by high priority survey questions).

Referring to FIG. 18, a table 1800 represents another embodiment of the survey database 28 of FIG. 2. A table such as the table 1800 would typically exist for each entry of the table 400 (FIG. 4). The table 1800 includes an identifier 1802 uniquely identifying the survey questions represented thereby. The table 1800 also includes rows 1804 and 1806, each of which defines a survey question. In particular, each entry includes (i) a question identifier 1808 that uniquely identifies the survey question of the table 1800; (ii) a question description 1810, which may be in the form of text, graphical image, audio or a combination thereof; (iii) an answer sequence 1812 defining possible responses which the respondent may select, and an order of those responses; and (iv) a priority 1814 of the survey question.

Higher priority survey questions may be sent to more respondents than lower priority questions. For example, high priority survey questions may be transmitted to respondents, and then depending on an amount of resources remaining (e.g. money to pay respondents), a selected set of the low priority survey questions may be transmitted to a smaller number of respondents. Accordingly, it is possible that some survey questions will never be transmitted to respondents. In another embodiment, lower priority survey questions are transmitted to respondents only after a desired confidence level is reached for higher priority survey questions.

Survey questions may also be variable in that they incorporate information such as responses to other survey questions or responses by other respondents to the same survey question. For example, if a large number of respondents indicate that the color "green" is the most preferred for a new car, then additional survey questions may be directed towards the color "green". Accordingly, there may be a survey question (e.g. "Why do you like color [X]?") and adjusted questions are created based on the fact that responses indicate the color "green" is most preferred. Subsequent survey questions may be based on the responses (e.g. "Do you prefer lime green or dark green?").

In one embodiment of the present invention, the client may specify survey questions that include one or more question parameters. Corresponding respondent questions are created by a random or calculated selection of values for the question parameters. Subsequently-generated respondent questions may have values selected based on responses received for previously-generated respondent questions, in an effort to generate respondent questions that achieve a more favorable response. Accordingly, the creation of corresponding respondent questions from such survey questions is dynamic, and so these survey questions are referred to as "dynamic survey questions". Dynamic survey questions are best employed when it is difficult or impossible to know in advance which respondent questions or which parameters of questions are most desirable. In addition, the dynamic nature of respondent question generation is based on human intervention—the participation of respondents.

For example, a dynamic survey question may comprise a logo having four parameters: a foreground color, a background color, a font size and a font type. Each parameter may assume a plurality of values. Respondent questions which define logos having specific colors, font sizes and font types are created and transmitted to respondents. Based on received responses (e.g. most respondents like red and blue, few like logos that have a certain font type), additional respondent questions are created and transmitted (e.g. logos that are red and blue, and that have a well-liked font).

Certain survey questions may define comparisons to be made, so the respondent would answer based on a comparison of two (or more) things. For example, the respondent may be asked to indicate which of two logos he prefers, which of four slogans he finds least annoying, or which of three sounds he thinks is the most attention-getting. Comparison is especially advantageous when it may be difficult for a respondent to provide an evaluation in absolute terms. For example, it may be difficult for a respondent to provide an absolute amount by which he prefers a certain logo, but he can more easily indicate which of two logos he prefers.

Similarly, once a response to a comparison is received, the respondent may be asked to compare similar things until his response changes. In one embodiment, one feature of an object to compare may be gradually altered until the respondent changes his response. For example, the respondent may indicate that he prefers a first logo to a second logo. Then, the font size of the first logo is increased until the respondent indicates that he prefers the second logo.

Dynamic survey questions may employ principles of genetic algorithms, as well as other known techniques for adjusting parameters to improve an output. Genetic algorithms are described in "Genetic Programming II", by John R. Koza, published by The MIT Press, 1994.

It may be desirable to register the response time for each respondent question received, and use that response time as part of the data summarized for the client. For example, in indicating which of two logos is preferred, the client may desire to know whether respondents answered quickly or slowly. Short response times would tend to indicate the comparison was very easy and thus the chosen logo was clearly preferred, while long response times would tend to indicate the comparison was difficult and thus the chosen logo was marginally preferred.

Although the present invention has been described with respect to a preferred embodiment thereof, those skilled in the art will note that various substitutions may be made to those embodiments described herein without departing from the spirit and scope of the present invention. For example, some or all of the steps performed by the controller may be performed by a respondent device.

What is claimed is:

1. A system for administering a survey including a survey question and a respondent, the system comprising:

means for creating a respondent question based on the survey question;

means for transmitting the respondent question to the respondent;

means for receiving a response from the respondent, the response corresponding to the respondent question;

means for applying an inconsistency test to the response to generate an inconsistency test result; and means for creating an adjusted question based on the response and the survey question.

2. A system for administering a survey including a survey question and a respondent, the system comprising:

means for creating a respondent question based on the survey question;

means for transmitting the respondent question to the respondent;

means for receiving a response from the respondent, the response corresponding to the respondent question; and means for applying an inconsistency test to the response to generate an inconsistency test result, wherein the means for receiving a response comprises:

means for receiving responses from a plurality of respondents; and means for creating an adjusted question based on the responses and the survey question.

3. A method comprising:

selecting a first value for a question parameter;

generating a first respondent question having the first value for the question parameter;

transmitting the first respondent question to the respondent;

receiving a response to the first respondent question from the respondent;

applying an inconsistency test to the response to the first respondent question to generate an inconsistency test result;

selecting a second value for the question parameter based on the response to the first respondent question; and generating a second respondent question having the second value for the question parameter.

4. The method of claim 3, further comprising:

transmitting the second respondent question to the respondent; and receiving a response to the second respondent question.

5. The method of claim 3, further comprising:

transmitting the second respondent question to a second respondent; and receiving a response to the second respondent question.

6. The method of claim 3, further comprising:

generating a fraud signal if the inconsistency test result is greater than a predetermined threshold.

7. The method of claim 3, further comprising:

selecting the respondent from a plurality of respondents.

8. The method of claim 3, in which generating the first respondent question comprises:

generating the first respondent question based on a survey question, in which the survey question includes at least one question parameter.

9. The method of claim 3, in which selecting the first value comprises:

selecting the first value at random.

10. The method of claim 3, further comprising:

transmitting the second respondent question to the respondent;

receiving a response to the second respondent question; and determining whether the response to the first respondent question and the response to the second respondent question define a predetermined pattern.

11. The method of claim 10, further comprising:

generating a fraud signal if the response to the first respondent question and the response to the second respondent question define a predetermined pattern.

12. The method of claim 3, in which the question parameter corresponds to at least one of:

a color, a font size, and a font type.

13. The method of claim 3, in which the first respondent question comprises at least one of:

a logo, a slogan, and a sound.

14. A method comprising:

selecting a first value for a feature;

generating a first object having the first value for the feature;

selecting a second value for the feature, in which the second value is not equal to the first value;

generating a second object having the second value for the feature;

generating a first respondent question, the first respondent question including:

the first object having the first value for the feature, and the second object having the second value for the feature;

transmitting the first respondent question to a respondent;

receiving a response to the first respondent question from the respondent, the response to the first respondent question indicating a preference of the respondent for the first object over the second object;

applying an inconsistency test to the response to the first respondent question to generate an inconsistency test result;

selecting a third value for the feature, in which the third value is not equal to the first value;

generating a third object having the third value for the feature;

generating a second respondent question, the second respondent question including:

the third object having the third value for the feature, and the second object having the second value for the feature; and transmitting the second respondent question to the respondent.

15. The method of claim 14, further comprising:

generating a fraud signal if the inconsistency test result is greater than a predetermined threshold.

16. The method of claim 14, further comprising:

selecting the respondent from a plurality of respondents.

17. The method of claim 14, in which generating the first respondent question comprises:

generating the first respondent question based on a survey question, in which the survey question defines a comparison.

18. The method of claim 14, in which selecting the first value comprises:

selecting the first value at random.

19. The method of claim 14, further comprising:

transmitting the second respondent question to the respondent;

receiving a response to the second respondent question; and determining whether the response to the first respondent question and the response to the second respondent question define a predetermined pattern.

20. The method of claim 19, further comprising:

generating a fraud signal if the response to the first respondent question and the response to the second respondent question define a predetermined pattern.

21. The method of claim 14, in which the feature corresponds to at least one of:

a color, a font size, and a font type.

22. The method of claim 14, in which the first respondent question comprises at least one of:

a logo, a slogan, and a sound.

* * * * *

UNITED STATES PATENT AND TRADEMARK OFFICE
CERTIFICATE OF CORRECTION

PATENT NO.    : 6,616,458 B1
DATED         : September 9, 2003
INVENTOR(S)   : Jay S. Walker, James A. Jorasch and Magdalena Mik It is certified that error appears in the above-identified patent and that said Letters Patent is hereby corrected as shown below:

Title page,
Item [73], Assignee, please insert the following:
-- Walker Digital, LLC, Stamford, CT (US) --

Signed and Sealed this

Tenth Day of May, 2005

JON W. DUDAS
*Director of the United States Patent and Trademark Office*